United States Patent [19]
Taylor et al.

[11] Patent Number: 5,978,653
[45] Date of Patent: Nov. 2, 1999

[54] METHOD AND APPARATUS FOR PROVIDING ADDITIONAL RESOURCES IN A SATELLITE COMMUNICATION SYSTEM

[75] Inventors: Ronald Fredrick Taylor, Phoenix; Scott David Blanchard, Mesa; Patrick David Jeffers, Chandler, all of Ariz.

[73] Assignee: Motorola, Inc., Schaumburg, Ill.

[21] Appl. No.: 08/850,543

[22] Filed: May 2, 1997

[51] Int. Cl.⁶ .................................................. H04B 7/185
[52] U.S. Cl. ......................................... 455/13.1; 455/430
[58] Field of Search .............................. 455/9, 12.1, 13.1, 455/13.2, 16, 427, 428, 450, 452, 509, 430

[56] References Cited

U.S. PATENT DOCUMENTS

| | | | |
|---|---|---|---|
| 5,448,621 | 9/1995 | Knudsen | 455/16 |
| 5,490,087 | 2/1996 | Redden et al. | 455/13.1 |
| 5,574,969 | 11/1996 | Olds et al. | 455/12.1 |
| 5,579,536 | 11/1996 | Stackman et al. | 455/12.1 |
| 5,813,634 | 9/1998 | Pizzicaroli | 455/427 |

*Primary Examiner*—Nguyen Vo
*Attorney, Agent, or Firm*—Walter W. Nielsen; James E. Klekotka

[57] ABSTRACT

Additional resources and services are provided in a satellite communication system (100) through the use of seam satellites (52). One or more seam satellites (52) are coupled to communication satellites (12) in an existing constellation using previously unused crosslinks. The seam satellites (52) are located between orbital planes (31 and 36) in which the communication satellites (12) are moving in opposite directions with respect to each other. Seam satellites (52) can provide new services such as earth sensing and observation. Seam satellites (52) can also provide attachment points for other new space-based users. Some of the communication units (26) can communicate with the seam satellites (52) via communication satellites (12). This allows these communication units (26) to use the new services provided by the seam satellite (52). Seam satellites (52) can be controlled by separate control centers or can be controlled by the control center for the communication satellites (12).

20 Claims, 5 Drawing Sheets

METHOD AND APPARATUS FOR PROVIDING ADDITIONAL RESOURCES IN A SATELLITE COMMUNICATION SYSTEM

FIELD OF THE INVENTION

This invention relates generally to communication systems and, more particularly, to apparatus and methods for providing additional resources and services in a satellite communication system.

BACKGROUND OF THE INVENTION

Large satellite communication systems are expensive to build and place in orbit. Because of the expense, it is not typically feasible to supplement present day satellite communication systems with other satellite communication systems if the present day systems have excess useable capacity.

A "satellite" is defined herein to mean a man-made object or vehicle intended to orbit Earth and includes both geostationary and orbiting satellites and/or combinations thereof. A "constellation" is defined herein to mean an ensemble of satellites arranged in orbits for providing specified coverage (for example, radio communication, remote sensing, etc.) of a portion or all portions of the celestial body. A constellation typically includes multiple satellites which may be arranged in multiple rings (planes) and may have equal numbers of satellites in each plane, although this is not essential.

A direct communication link between two satellites is referred to herein as a "crosslink". A crosslink is maintained where both the source and the destination or intermediate satellite's communication antennas are pointed toward each other and data communication is occurring. In a satellite communication system where satellites travel in the same direction, only small adjustments to a communication antenna's position are necessary to maintain a crosslink.

During each orbit, a non-geosynchronous satellite will travel in both an ascending (i.e., northbound) and a descending (i.e., southbound) direction. Where multiple, parallel orbital planes exist, satellites in a first orbital plane may travel in the same direction as satellites in an adjacent orbital plane, or the satellites in the first orbital plane may travel in the opposite direction (e.g., satellites in a first orbital plane are ascending and satellites in an adjacent orbital plane are descending). The space between these "counter-rotating" orbital planes is referred to herein as a "seam".

Typical satellite communication systems do not provide a method for maintaining a crosslink between satellites in adjacent orbital planes that are traveling in opposite directions. For this reason, crosslinks are not fully utilized. Satellites positioned on the "edge" of the constellation do not use all of the crosslink capability they have on-board. Typically, there is a seam on each side of the celestial body about which the satellites are orbiting.

In satellite communication systems generally, resources are managed by allocating channels to communication units as they become available within a given service area. If subscribers attempt to access the system while all resources are busy, they are generally denied access and are instructed to re-attempt accessing the system at a later time. In cellular communication systems, resources are expanded by partitioning service areas into cells and allowing reuse of communication resources. This reuse permits a greater number of users to access a satellite communication system.

In space-based cellular communication systems, however, additional potential users may not be located on the surface of the earth. Space-based communication systems must provide capabilities and mechanisms which can be used to provide communication services to additional users located in space.

Space based resources must be managed to allow additional users to gain access to the system. In order to increase services, communication links must be established between the additional resource and satellites in the existing constellation. If resources required for an additional link are unavailable, then the communication link will not be established by the additional resource. Allowing space based resources to be under utilized is unacceptable in a commercially viable communication system.

Accordingly, there is a significant need for apparatus and methods that allow acquisition of communication services by resources which are located in a space environment and provide a reliable communication link between existing satellite communication systems and new resources.

There is also a significant need for apparatus and methods which enable the processing and/or data carrying capacity within a particular satellite communication system to be increased relative to new demands and in conjunction with state-of-the-art technology. In addition, there is a significant need for apparatus and methods for increasing the utilization of the on-board resources of orbiting satellites without modifying the satellites.

BRIEF DESCRIPTION OF THE DRAWINGS

A more complete understanding of the present invention can be derived by referring to the detailed description and claims when considered in connection with the figures, wherein like reference numbers refer to similar items throughout the figures, and:

DETAILED DESCRIPTION OF A PREFERRED EMBODIMENT

The method and apparatus of the present invention enable new resources and services to be provided within an existing satellite communication system. Resources and services can be increased relative to new demands and in conjunction with state-of-the-art technology. The method and apparatus of the present invention also allow the satellite communication systems to increase the utilization of the on-board resources of orbiting satellites without modifying the satellites.

The method and apparatus of the present invention increase on-orbit capability through the use of seam satellites. Seam satellites are additional satellites which are positioned to take advantage of the unused crosslink capacity that exists in some satellite constellations. The seam satellite or satellites are located within the seam of an established constellation. The seam satellites orbiting parameters are designed to allow at least one seam satellite to establish a crosslink to at least one communication satellite in the existing constellation.

A new service can be hosted on the seam satellite. The seam satellite can be a single LEO spacecraft providing new services, through the use of the host constellation. In a preferred embodiment, the seam satellite is an earth observation satellite performing earth imaging, terrain mapping, atmospheric measurements and other measurements of the earth. In alternate embodiments, the seam satellite can be a message relay communications satellite, supporting an electronic mail delivery function when the seam satellite is in view of the user.

In other embodiments, satellites can be grouped together into operational clusters with interconnected and synchronized satellites. Through the use of this technique, large multi-dimensional systems can be placed in orbit. As used herein, a "cluster" of satellites is defined as a grouping of satellites with crosslink communication capabilities with each other. The satellites can be clustered to achieve a single mission, such as telecommunications. By integrating multiple different satellites through a seam satellite that is interconnected to an existing constellation, increased processing power and mission capabilities can be established in orbit. Using the apparatus and methods of the present invention, the constellation's mission can be increased over its initial telecommunication mission in a cost effective manner.

The amount of additional satellites can be paced to meet the demands of the new missions. This approach improves costs because resources are properly managed. Resources are provided based on need which means it is not necessary to provide resources to meet a demand for those resources until that demand actually exists.

This approach requires algorithms for calculating node loading to be modified from time to time so that new seam satellites can be added from time to time without significantly altering the existing data throughput.

For example, a cluster of satellites could be provided along with at least one synchronized seam satellite. In this example, the satellites in the satellite cluster are positioned such that they are in data communication with one or more seam satellites. This is possible because only one seam satellite is needed to establish a communication channel with a satellite communication system in space. Other satellites in the satellite cluster can be capable of becoming seam satellites. This would allow failed seam satellites to be replaced with minimum impact. The location of satellites can be changed to allow failed or failing seam satellites to be replaced by a different satellite from the cluster which has been reconfigured to function as a seam satellite.

Alternate embodiments of the present invention are applicable to satellites in all orbital types, which include, but are not limited to Low Earth Orbit (LEO), Medium Earth Orbit (MEO), Geosynchronous Earth Orbit (GEO), and Highly Elliptical Orbit (HEO) satellites. Satellite clusters can be established using different numbers of satellites in different orbits and different numbers of seam satellites in synchronized orbits. For example, a seam satellite could be put into a synchronized orbit to control and communicate with additional satellites in one or more non-geosynchronous orbits. In addition, a seam satellite could be put into a synchronized orbit to control and communicate with additional satellites in one or more geosynchronous orbits.

In one embodiment, all of the satellites in the cluster can contain controllers which allow the satellites to operate independent from the satellite communication system, and all of the satellites can be interconnected with each other through cluster crosslinks. Synchronization of the satellites in the cluster could be accomplished by establishing one controller as a system controller for the satellite cluster and by making the other satellites perform as slaves. In this way, the system controller controls and synchronizes the slave satellites. In addition, at least one satellite of the cluster of satellites communicates with at least one ground device over a downlink.

Figure 1:
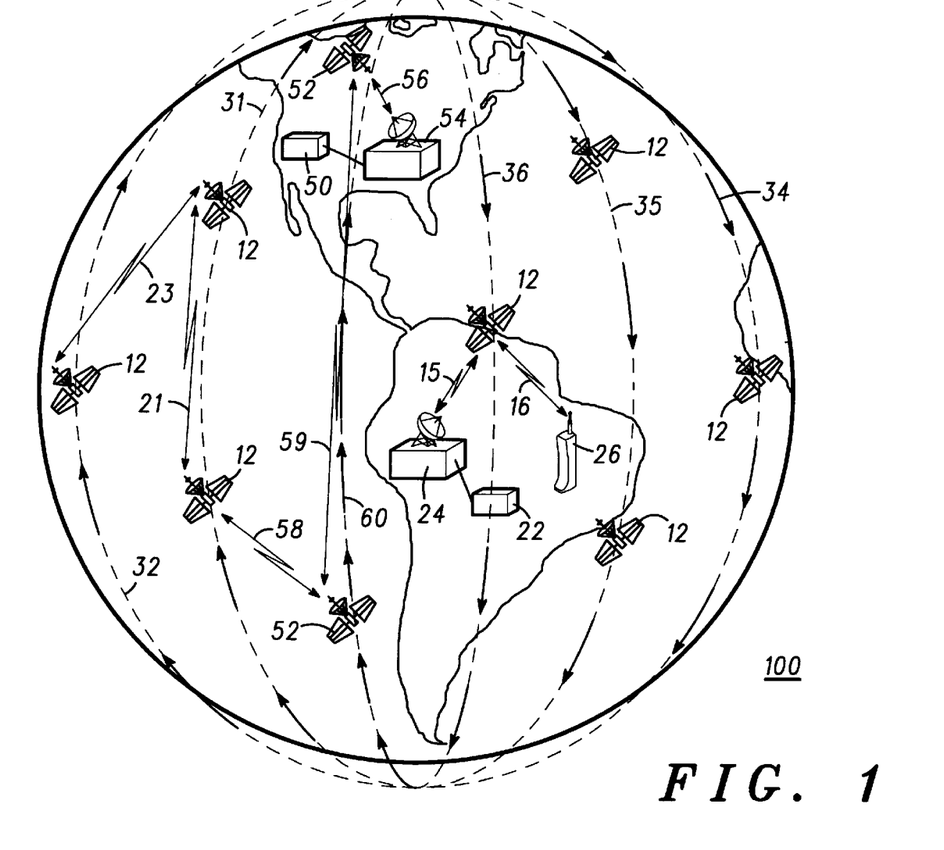
FIG. 1 shows a simplified block diagram of a satellite communication system in which additional resources and services are provided by seam satellites with synchronized orbits in accordance with a preferred embodiment of the present invention.

FIG. 1 shows a simplified block diagram of a satellite communication system in which additional resources and services are provided by seam satellites with synchronized orbits in accordance with a preferred embodiment of the present invention. Satellite communication system 100 comprises communication satellites 12, seam satellites 52, communication system earth terminals 24, seam satellite earth terminals 54, communication system control center 22, seam satellite control center 50, and communication units 26. The apparatus and methods of the present invention do not require seam satellite control center 50 to be located at a location different from that for communication system control center 22. Further, the apparatus and methods of the present invention do not require seam satellite earth terminals 54 to be separate and distinct from communication system earth terminals 24.

Satellite communication system 100 uses six orbital planes but only five orbital planes 31, 32, 34, 35, and 36 are shown. Each orbital plane holds eleven communication satellites 12 for a total of sixty-six communication satellites. However, this is not essential and more or fewer satellites, or more or fewer orbital planes, can be used. While the present invention is advantageously employed when a full constellation of satellites is being used, it is also applicable when a less than full constellation of satellites is available. For clarity, FIG. 1 illustrates only a few of communication satellites 12 and two seam satellites 52.

For example, each orbit encircles Earth at an altitude of around 780 km, although higher or lower orbital altitudes can be usefully employed. For the example shown, communication satellites 12 and seam satellites 52 travel with respect to Earth at around 25,000 km/hr. This allows communication satellites 12 and seam satellites 52 to be visible to a terrestrial station for a maximum period of circa nine minutes. The present invention is applicable to systems including satellites having low-earth, medium-earth and high-earth orbits. Additionally, it is applicable to orbits having any angle of inclination (e.g., polar, equatorial or other orbital pattern).

Communication satellites 12 communicate with terrestrial stations which can include some number of radio frequency (RF) communication units (CUs) 26 and earth terminals (ETs) 24 connected to communication system control center 22. Communication system control center 22 can be gateways (GWs), which provide access to the public switched telephone network (PSTN), or other communications facilities or system control centers. Only one each of communication system control centers 22 and communication system earth terminals 24 are shown in FIG. 1 for clarity and ease of understanding. Communication system earth terminals 24 can be co-located with or separate from communication system control center 22. Communication system control center 22 receives data describing tracking of communication satellites 12 and relay packets of control information, and relay data packets (e.g., relating to calls in progress).

CUs 26 can be located anywhere on the surface of the earth or in the atmosphere above the earth. CUs 26 are preferably communications devices capable of transmitting data to and receiving data from communication satellites 12 and seam satellites 52. By way of example, CUs 26 can be data terminals adapted to communicate with communication satellites 12. Communication unit 26 can also be a facsimile device, pager, data terminal, an imaging system terminal, or any other type of communication device adapted to transmit data to and/or receive data from seam satellite 52 via communication satellites 12.

Satellite communication system 100 can accommodate any number, potentially in the millions, of communication units 26. In a preferred embodiment of the present invention, communication units 26 communicate with nearby communication satellites 12 via subscriber links 16. Subscriber links 16 encompass a limited portion of the electromagnetic spectrum that is divided into numerous channels. Subscriber links 16 are preferably combinations of L-Band frequency channels and may encompass Frequency Division Multiplex Access (FDMA) and/or Time Division Multiple Access (TDMA) communications (infra) or combinations thereof.

Communication satellites 12 communicate with other nearby communication satellites 12 through crosslinks 21 and 23. In a preferred embodiment, there are no crosslinks between communication satellites 12 in orbital plane 31 and communication satellites 12 in orbital plane 36. Communication satellites 12 also can communicate with other nearby seam satellites 52 through crosslinks 58. Thus, a communication message to or from a communication unit 26 located at any point on or near the surface of the earth can be routed through the constellation of communication satellites 12 to seam satellites 52. A communication message can be routed to a communication unit 26 on or near the surface of the earth from a seam satellite 52 using at least one communication satellite 12 and a subscriber link 16. Alternatively, a communication message may be routed down to or up from any of many ETs 24, of which FIG. 1 shows only one, through link 15. ETs 24 are preferably distributed over the surface of the earth in accordance with geo-political boundaries.

A control center for the communication system monitors the health and status of system communication nodes and desirably manages operations of communication system 100. One or more ETs 24 provide the primary communications interface between SCS 22 and communication satellites 12. ETs 24 include antennas and RF transceivers and preferably perform telemetry, tracking and control functions for the constellation of communication satellites 12.

Gateways can perform call processing functions in conjunction with satellites, or gateways can exclusively handle call processing and allocation of call handling capacity within satellite communication system. Diverse terrestrial-based communications systems, such as the PSTN, may access the satellite communication system through gateways.

With the example constellation of sixty-six satellites, at least one of communication satellites 12 is within view of each point on Earth's surface at all times. This allows seam satellite 52 to be in direct or indirect data communication with any CU 26 or ET 24 at any time. Satellite communication system 100 can establish a communication path for relaying data through the constellation of communication satellites 12 from seam satellites 52.

Two seam satellites 52 are shown in orbital plane 60. In a preferred embodiment, orbital plane 60 is located between orbital plane 31 and orbital plane 36. In a preferred embodiment of the present invention, orbital planes 60 and 31 are different, but the satellites in each orbital plane travel in the same direction around the earth. The seam satellite's orbit is selected such that its relative rates are consistent with the host constellation satellites. One method for selecting such an orbit is to select an orbit calculated with the same equations used to select the host constellation orbits.

A collision avoidance plan must be developed based on problems which occur at the poles. Problems can occur because this is where the orbital planes intersect. In a preferred embodiment, the plan establishes a spacing actor of 1.3 degrees, and this factor is used to establish a spacing distance with respect to the orbit intersections at the poles. However, changing this spacing factor can easily be performed as part of normal station keeping operation. In an alternate embodiment, the direction of rotation for seam satellites 52 in orbital plane 60 could be the same as communication satellites 12 in orbital plane 36.

In a preferred embodiment, seam satellites 52 communicate with each other over crosslinks 59. Communication units 26 are shown located proximate to the surface of the earth. The present invention does not require communication units 26 to be on the surface of the earth. Communication units 26 can be located anywhere a communication channel can be provided between communication unit 26 and communication satellites 12.

At least one communication channel is provided via link 15 from communication units 26 to communication satellite 12. Communication units 26 can use link 15 to transmit messages and command signals to seam satellites 52 via communication satellites 12. Communication units can also use link 15 to receive downlink signals and response signals from seam satellites 52. In FIG. 1, only one communication unit 26 and only one link 15 are shown to simplify the explanation of the preferred embodiment shown. Those skilled in the art will recognize that many communication units 26 and many links 15 are possible. It should also be recognized that link 15 could be a uni-directional link.

Seam satellites 52 can communicate with seam satellite control center 50 via seam satellite earth terminal 54 and link 56. Link 56 provides a bi-directional communication channel for data signals to be sent between seam satellite control center 50 and seam satellites 52. Seam satellite control center 50 transmits uplink signals and command signals to seam satellites 52 and receives downlink signals and response signals from seam satellites 52. In FIG. 1, two seam satellites 52, one seam satellite control center 50, and one link 56 are shown to simplify the explanation of the preferred embodiment shown. Those skilled in the art will recognize that any number of seam satellites 52, seam satellite earth terminals 54, seam satellite control center 50, and links 56 are possible. Crosslinks 59 are used to interconnect seam satellites 52 when more than one seam satellite is being used. In alternate embodiments, communication system control centers 22 could be used to control seam satellites 52.

Figure 2:
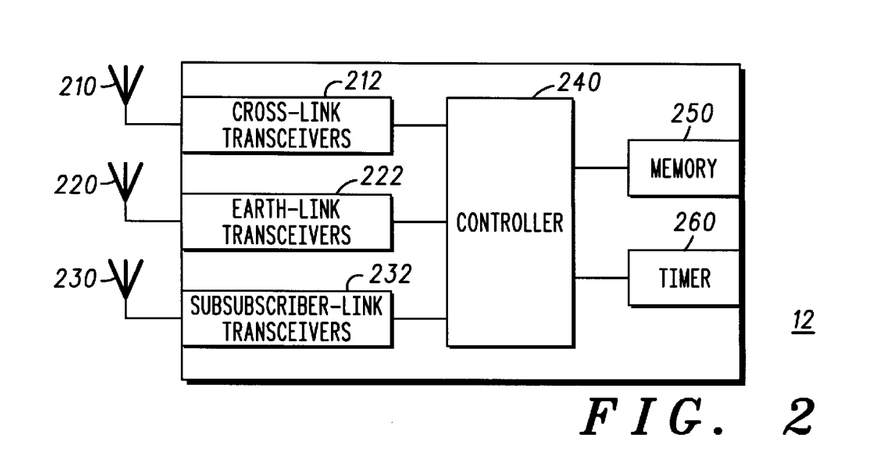
FIG. 2 shows a simplified block diagram of a communication satellite for use in accordance with a preferred embodiment of the present invention.

FIG. 2 shows a simplified block diagram of a communication satellite for use in accordance with a preferred embodiment of the present invention. Communication satellite 12 comprises crosslink antenna unit 210, crosslink transceivers 212, earth link antenna unit 220, earth link transceivers 222, subscriber link antenna unit 230, subscriber link transceivers 232, controller 240, memory 250, and timer 260. Crosslink transceivers 212 and crosslink antenna unit 210 support crosslinks to other nearby communication satellites 12. Earth-link transceivers 222 and associated earth link antenna units 220 support earth-links to communicate with earth terminals 24 (FIG. 1). In a preferred embodiment, earth link transceiver 222 and associated earth link antenna unit 220 also support earth-links to communicate with earth terminal 54 (FIG. 1).

Subscriber link transceivers 232 and associated subscriber link antenna unit 230 support communication units 26 (FIG. 1). Of course, those skilled in the art will appreciate that antennas units 210 and 220 can be implemented either as single multi-directional antennas or as banks of discrete antennas. It is desirable that each subscriber link antenna unit 230 be a phased array antenna capable of accessing many cells simultaneously.

A controller 240 couples each of transceivers 212, 222, and 232 as well as to a memory 250 and a timer 260. Controller 240 can be implemented using one or more processors. Controller 240 uses timer 260 to maintain, among other things, the current date and time. Memory 250 stores data that serve as instructions to controller 240 and that, when executed by controller 240, cause communication satellite 12 to carry out procedures which are discussed below. In addition, memory 250 includes variables, tables, and databases that are manipulated during the operation of communication satellite 12.

Subscriber link transceivers 232 are desirably multi-channel FDMA/TDMA transceivers capable of transmitting and receiving on all different selectable frequencies during particular, selectable, time slots as directed by controller 240. Subscriber link transceivers 232 contain multi-channel radios having a sufficient number of channels to provide the desired number of transmission and reception frequencies for signal access and control and for the user voice and/or data.

Controller 240 can provide for allocation of the frequency and time-slot assignments, cell-to-cell hand-off and other overhead and management and control functions. Controller 240 provides for allocation of the frequency and time-slot assignments for crosslinks between satellites. Crosslink transceivers 212 desirably provide for transmission and reception on many frequency channels. Therefore, each crosslink transceiver 212 may, if needed, utilize the entire spectral capacity of all frequency channel sets by having the capability to handle all frequency and time slot assignments.

Crosslink antenna unit 210 can be a radio frequency (RF) device or a laser device. It will be understood that while each communication satellite 12 is illustrated in FIG. 2 as having a single antenna unit 210 and 220, each antenna unit 210 and 220 can comprise several antennas (e.g., a phased array antenna). Those skilled in the art will appreciate that instead of a bank of discrete, uni-directional antennas, crosslink antenna unit 210 and 220 can be implemented as single, phased-array antennas or as a combination of uni-directional antennas and phased-array antennas. Transceivers 212, 222, and 232 are used to demodulate data received by satellite 12 and to modulate data for transmission from communication satellite 12.

Communication satellites 12 can communicate with other communication satellites 12 and also with seam satellites 52 via crosslinks established by crosslink antenna unit 210 and crosslink transceivers 212. Crosslinks are used to interconnect communication satellites 12 into a communication system and to connect seam satellites to the communication system. Crosslinks provide communication paths for data and timing signals between communication satellites 12. Crosslinks also provide communication paths for data and timing signals between seam satellites 52 and communication satellites 12. The data exchanged on crosslinks can be used to control and coordinate the data transfer.

Figure 3:
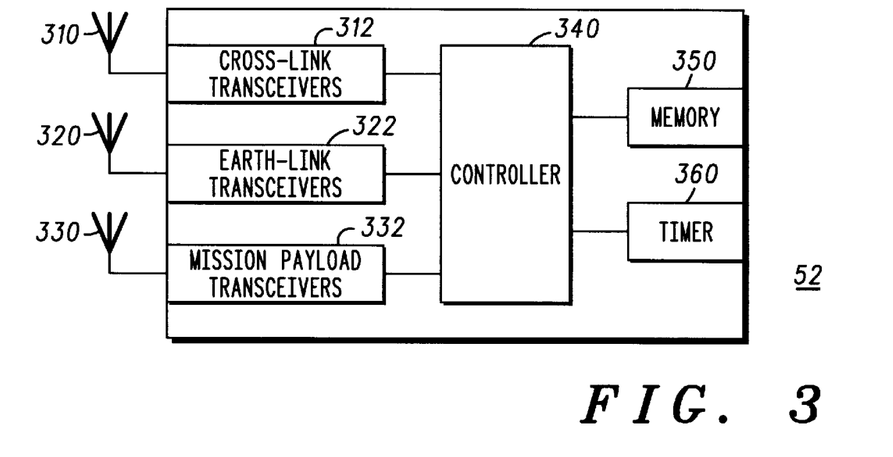
FIG. 3 shows a simplified block diagram of a seam satellite for use in accordance with a preferred embodiment of the present invention.

FIG. 3 shows a simplified block diagram of a seam satellite for use in accordance with a preferred embodiment of the present invention. Seam satellite 52 comprises crosslink antenna unit 310, crosslink transceivers 312, earth link antenna unit 320, earth link transceivers 322, mission payload antenna unit 330, mission payload transceivers 332, controller 340, memory 350, and timer 360. Crosslink transceivers 312 and crosslink antenna unit 310 support crosslinks to communication satellites 12. Earth-link transceivers 322 and associated earth link antenna units 320 support earth-links to communicate with earth terminals 54 (FIG. 1). In a preferred embodiment, earth link transceiver 322 and associated earth link antenna unit 320 also support earth-links to communicate with earth terminal 24 (FIG. 1).

Mission payload transceivers 332 and associated mission payload antenna unit 330 support mission critical data transmission and reception. In a preferred embodiment, the seam satellites use the same crosslink components as the communication satellites in order to minimize cost.

In an alternate embodiment, seam satellite 52 may simultaneously support links to several other satellites operating in various orbits. Of course, those skilled in the art will appreciate that antennas units 310 and 320 can be implemented either as single multi-directional antennas or as banks of discrete antennas. It may be desirable that each mission payload antenna unit 330 be a phased array antenna capable of accessing many other satellites simultaneously.

Controller 340 interconnects each of transceivers 312, 322, and 332 and couples them to memory 350 and timer 360. Controller 340 can be implemented using one or more processors. Controller 340 uses timer 360 to maintain, among other things, the current date and time. Memory 350 stores data that serve as instructions to controller 340 and that, when executed by controller 340, cause seam satellite 52 to carry out procedures which are discussed below. In addition, memory 350 includes variables, tables, and databases that are manipulated during the operation of seam satellite 52.

Controller 340 can provide for allocation of the frequency and time-slot assignments, mission payload control and operation, and other overhead and management and control functions. Controller 340 provides for allocation of the frequency and time-slot assignments for crosslinks between seam satellite 52 and communication satellites 12. Crosslink transceivers 312 desirably provide for transmission and reception on many frequency channels. Therefore, each crosslink transceiver 312 may, if needed, utilize the entire spectral capacity of all frequency channel sets by having the capability to handle all frequency and time slot assignments.

Crosslink antenna unit 310 can be a radio frequency (RF) device or a laser device. It will be understood that while each seam satellite 52 is illustrated in FIG. 3 as having a single antenna unit 310 and 320, each antenna unit 310 and 320 can comprise several antennas (e.g., a phased array antenna). Those skilled in the art will appreciate that instead of a bank of discrete, uni-directional antennas, antenna unit 310 and 320 can be implemented as single, phased-array antennas or as a combination of uni-directional antennas and phased-array antennas.

Transceivers 312, 322, and 332 are used to demodulate data received by communication satellite 12 and to modulate data for transmission from communication satellite 12. Crosslink transceiver 312 also provides timing circuits for maintaining synchronization across the communication channel provided by crosslink 58 (FIG. 1). Crosslink transceiver 312 also contains buffering circuitry to allow efficient crosslink data transfers.

Seam satellites 52 can communicate with communication satellites 12 via crosslinks established by crosslink antenna unit 310 and crosslink transceivers 312. Crosslinks are used to connect seam satellites 52 into a communication system. Crosslinks provide communication paths for data and timing signals between seam satellites 52 and communication satellites 12. The data exchanged on crosslinks can be used to control seam satellite 52.

Mission payload transceivers 332 and mission payload antenna unit 330 could be used to connect additional satellites. These additional satellites could be a satellite cluster. The satellites in the satellite cluster can be in the same orbit or not. Additional embodiments of the present invention can be obtained by changing the number of satellites in a satellite cluster, the number of satellite clusters, and/or their positions relative to each other and relative to the earth.

Antenna unit 320 is used to communicate with transmitting and receiving sources which can be located on the earth. In a preferred embodiment, antenna unit 320 is used to transmit and receive signals to and from earth terminals 54 (FIG. 1) and to and from seam satellite control center 50 (FIG. 1). It will be understood that while each seam satellite 52 is illustrated in FIG. 3 as having a single antenna unit 320, each antenna unit 320 can comprise several antennas (e.g., a phased array antenna). These antennas can be of different types so that seam satellite 52 can communicate with more than one earth terminal 54 and 24 (FIG. 1) at a time. Those skilled in the art will appreciate that instead of a bank of discrete, unidirectional antennas, antenna unit 320 can be implemented as a single, phased-array antenna or as a combination of uni-directional antennas and phased-array antennas.

Antenna unit 320 is coupled to transceiver 322 which is used to convert and demodulate the uplink signals received from antenna unit 320 into uplink data which can be sent to controller 340. Transceiver 322 also is used to modulate downlink data received from controller 340 into downlink signals which can be transmitted by antenna unit 320.

Seam satellite 52 desirably includes several "elements" that can be controlled individually and which can be used as in primary mission subsystems or in secondary mission subsystems. As used herein, an "element" is any component or group of components on-board a seam satellite which can be individually controlled as a single-element subsystem, or controlled as a part of a multi-element subsystem. Elements can be used (e.g., turned on or off) as needed, depending on the required mission critical activity. The ability to control individual elements of seam satellite 52 enables conservation of power on each satellite and management of power resources with respect to mission requirements. For example, power consumption is particularly important for LEO constellations in which satellites spend considerable time in the shadow of the earth where their solar cells cannot replenish battery power.

Individual elements in seam satellite 52 are used in single-element and multi-element subsystems to process mission critical data, process uplink data, process downlink data, process crosslink transmitted data, and process crosslink received data, to perform computational tasks and to control operations on a seam satellite.

In a preferred embodiment of the present invention, seam satellites comprise a primary element and one or more secondary elements. Desirably, a secondary element can become a primary element if a failure occurs in the primary element.

In a preferred embodiment, controller 340 not only maintains the seam satellite's health and controls the operation of seam satellite 52 (FIG. 1) in response to commands from seam satellite control center 50 (FIG. 1), but it also conducts some of the necessary mission critical analysis for the satellite.

A mission critical subsystem contains the elements of the satellite that are dedicated to a specific mission. Mission critical subsystems provide and use mission critical data. Exemplary missions performed by mission critical subsystems are optical monitoring of the earth or communications relaying.

Crosslink transceiver 312 is coupled to crosslink antenna units 310 and contains elements to control the operation of crosslink antenna units 310.

Crosslink transceiver 312 converts crosslink transmitted data into crosslink transmitted signals and converts crosslink received signals into crosslink received data. The crosslink transmitted data is data which is sent to a communication satellite in the constellation. The crosslink received data is data which is received by a seam satellite from a communication satellite in the constellation.

Figure 4:
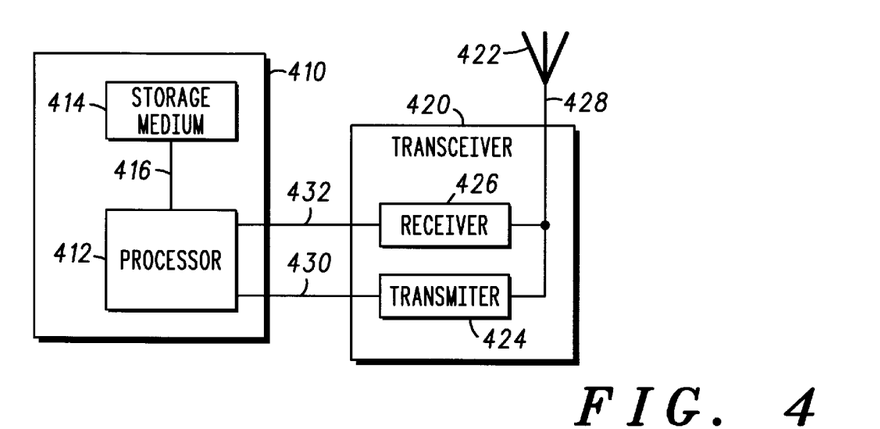
FIG. 4 shows a simplified block diagram of a system control station and an earth terminal suitable for use in accordance with a preferred embodiment of the present invention.

FIG. 4 illustrates a simplified block diagram of a system control station and an earth terminal suitable for use in a preferred embodiment of the present invention. Control station 410 and terrestrial station 420 are desirably part of seam satellite control center 50 (FIG. 1) and seam satellite earth terminal 54 (FIG. 1) respectively. Control station 410 comprises processor 412 coupled to associated storage medium 414 (e.g., random access memory or RAM, other semiconductor or magnetic read-write memory devices, optical disk, magnetic tape, floppy disk, hard disk etc.) via link 416. Terrestrial station 420 includes antenna 422 coupled to transmitter 424 and receiver 426 via link 428. Transmitter 424 and receiver 426 are coupled to processor 412 via links 430 and 432, respectively. Processor 412 desirably carries out procedures exemplified below and described in the associated text. For example, in addition to performing other tasks as appropriate, processor 412 desirably stores results from such procedures in storage medium 414. Transmitter 424 and/or receiver 426 transmit messages to and/or receive messages from seam satellites 52.

Processor 412 generally controls and manages user access, message reception and transmission, channel set-up, radio tuning, frequency and time slot assignment, and other communication and control functions not otherwise managed or provided for by the satellite communication system. Among other things, processor 412 desirably executes procedures to control seam satellite's position. Position control must be done to synchronize the seam satellite to communication satellites 12. This may include procedures for establishing access, for doing hand-offs to other satellites, and other associated functions as discussed below.

Figure 5:
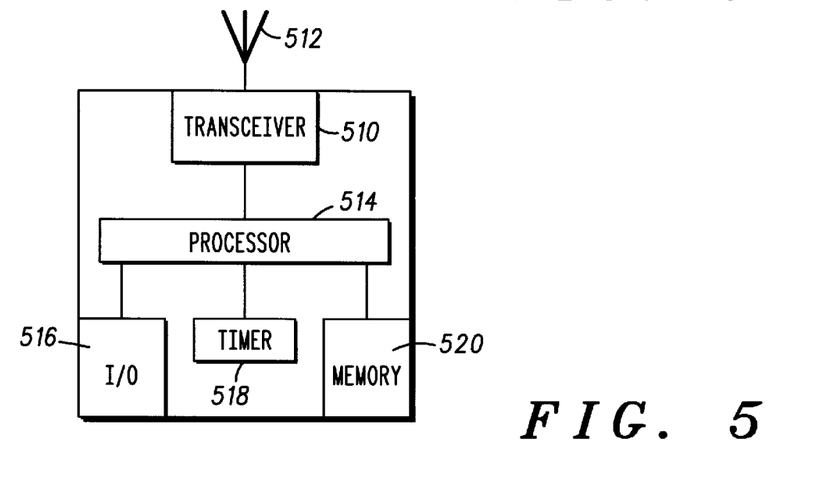
FIG. 5 shows a simplified block diagram of a communication unit suitable for use in accordance with a preferred embodiment of the present invention.

FIG. 5 illustrates a simplified block diagram of a communication unit suitable for use in a preferred embodiment of the present invention. Communication unit 26 (analogous to communication unit 26 of FIG. 1) communicates with communication system 100, and can also communicate through communication system 100 to seam satellite 52. Communication unit 26 includes transceiver 510 which transmits and receives signals to and from seam satellite 52 via communication satellites 12 using antenna 512. Transceiver 510 is desirably a multi-channel transceiver capable of transmitting and receiving on all frequency channels in specified time slots as required by communication satellites 12.

Transceiver 510 desirably comprises an acquisition channel transceiver portion, a broadcast channel receiver portion, and a traffic channel transceiver portion. The acquisition channel transceiver portion communicates on one of several acquisition channels as determined by communication satellite 12 and is primarily used during access protocols when a subscriber desires access to the communication system. The traffic channel transceiver portion communicates with seam satellite 52 using a traffic channel assigned by communication satellite 12. Those of ordinary skill in the art will understand that the acquisition channel transceiver portion, the broadcast channel receiver portion and the traffic channel transceiver portion can be contained in one unit capable of all three functions.

The broadcast channel can contain a posting of the seam satellite access status as determined by the system. Status determining operations can be performed by control centers, gateways, and/or satellites. A broadcast channel may contain seam satellite access status information in each transmission of the broadcast channel or in specific transmissions intended for particular communication units. The seam satellite access status can be contained in a node access list. Transmitting the node access list on a broadcast channel of the satellite communication system is one method used to inform certain system resources (particular communication units) about a new terminating node (seam satellite). Users can be informed about low traffic times and the most economical times to use the constellation to access the seam satellite.

Transceiver 510 couples to a processor 514, which controls the frequency and timing parameters upon which transceiver 510 operates. In addition, processor 514 preferably controls the power level at which transceiver 510 transmits signals. Additionally, processor 514 desirably couples to input/output (I/O) section 516, timer 518, and memory 520. Processor 514 uses timer 518 to maintain the current date and time. Memory 520 includes semiconductor, magnetic, and other storage devices for storing data which serve as instructions to processor 514 and which, when executed by processor 514, cause communication unit 26 to carry out procedures which are discussed below. In addition, memory 520 includes variables, tables, and databases that are manipulated during the operation of communication unit 26.

Figure 6:
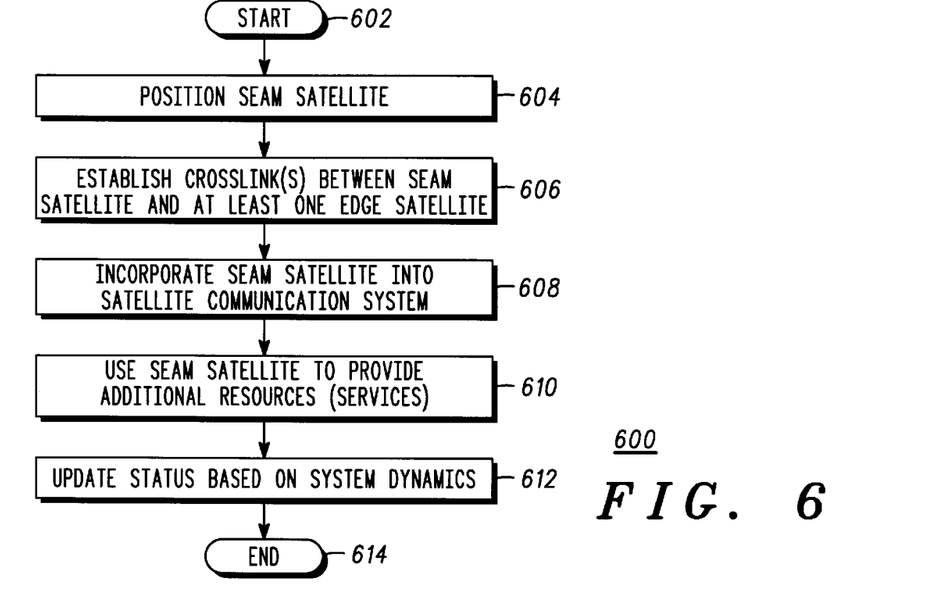
FIG. 6 shows a flow chart for incorporating a seam satellite into a communication system to provide additional resources in accordance with a preferred embodiment of the present invention.

FIG. 6 shows a flow chart for incorporating a seam satellite into a communication system to provide additional resources in accordance with a preferred embodiment of the present invention. Procedure 600 starts with step 602. The starting of procedure 600 could be the result of a company contacting another. In this case one company is responsible for the existing satellite constellation and the other company is responsible for the seam satellite.

In step 604, a seam satellite is positioned in an orbital plane which is consistent with the existing constellation's orbital configuration. For example, the existing constellation can be comprised of 66 satellites using an optimally phased Adam-Rider orbit configuration. In this example, the orbit of a satellite in this (k=1–k=6) plane and slot r (1–11) per plane constellation is characterized by the equations shown below:

| | |
|---|---|
| a = 3865.47 nm, | (semi-major axis) |
| e = 0.001264 degrees, | (eccentricity) |
| i = 86.4 degrees, | (inclination) |
| ω = 90 degrees, | (argument of perigee) |
| ΔΩ = 31.587 degrees, | (RAAN spacing) |
| Ω = Ω$_o$ + (k−1)* ΔΩ | (RAAN in deg.) |
| M = M$_o$ − (8.182)*((−1)$^r$+1) − c*(r−1)+32.727*(r−1) | (Mean Anomaly at Epoch in deg.) | where:

Ω$_o$ is an arbitrary right ascension of the ascending node (RAAN) selected for satellite k=1, r=1;

M$_o$ is an arbitrary mean Anomaly at Epoch selected for satellite k=1, r=1;

c is selected to avoid collisions at the pole where the plane intersects, and in this example is selected to be 1.3 degrees.

The seam satellite could be positioned in a slot in orbital plane (k=0) or orbital plane (k=7) with different or the same RAAN spacing. The seam satellite is in data communication with an earth station while performing operations to establish its orbital position. Those skilled in the art will recognize that for orbital plane (k=0) or (k=7) the seam satellite is outside of the seam area formed by the area between planes 1 and 6. By using the same equation to select the orbit of the seam satellite, the angular rates between the seam satellite and the edge satellite will be the same as all other cross-plane crosslinks.

In step 606, at least one crosslink is established between the seam satellite and at least one edge satellite in the existing constellation. This step can be initiated by either the seam satellite or the edge satellite. The seam satellite could transmit an access request to an edge communication satellite. This could result if a seam satellite were monitoring a region of space for crosslink signals being broadcast from communication satellites. This could also result from a seam satellite taking the initiative to try to gain access to a communication constellation. This also could be the result of a command from a system control center or an on-board process such as a timer expiration or data indication from a mission payload sensor. The seam satellite and the edge satellite cooperate to establish the communication channel between themselves.

When the edge communication satellite receives an access request from a seam satellite, then the edge satellite or a satellite control center determines if access should be granted or denied. A seam satellite will be denied access to crosslink resources when edge communication satellite or a satellite control center determines that the seam satellite is not a valid user. Access determination can also be based on the availability of crosslink resources and crosslink loading. Crosslinks can be shut-off or turned-on due to the satellite's latitudinal position.

In step 608, the seam satellite is incorporated into the satellite communication system. The seam satellite communicates with the edge communication satellite to establish communication parameters and access privileges. The seam satellite must have knowledge about the data formatting rules used by the edge communication satellites to exchange data. Seam satellites use these same rules. Inter-satellite crosslink queues are established to ensure that these event messages are not lost if the inter-satellite crosslinks are heavily loaded. The exchange of data includes passing control data between the seam satellite and the edge satellite to control the crosslink communication channel. The exchange also includes passing mission data between the seam satellite and the edge satellite as required to satisfy mission requirements.

The node access table for the system must be updated to account for the new node which has been added to the communication system. In some embodiments, the new node is not made available to all users of the communication system. The new node (seam satellite) is accessible through the edge satellites to which it is crosslinked. These edge satellites have their tables changed to reflect the addition of the new terminating node.

In step 610, the seam satellite is used to provide additional resources in the satellite communication system. No unique links are provided between the seam satellite and the edge satellites. The links used are the same as those used between the communication satellites in the constellation. In a preferred embodiment, the existing constellation is a global mobile satellite service, providing low rate voice and data services to hand held user terminals. To support global connectivity, the existing constellation satellites maintain communication links among satellites. Each satellite supports in-plane forward and aft links for communicating with each of its intra-planar neighbors. In addition, each satellite has two additional cross-links for communicating with satellites in adjacent planes. Each satellite is capable of communicating using the cross-link with the two closest satellites in each of the two adjacent planes. In addition, a tracking limitation does not allow communication between plane (k=1) and plane (k=6) satellites. This is due to excessive angular rates imposed by the chosen constellation configuration.

In a preferred embodiment, the seam satellite is a LEO Earth Observation Satellite (EOS). The EOS provides earth measurement data to specific users through the use of the existing constellation. This maximizes the utility of the satellite, while minimizing its on-board storage and data latency requirements. It is desirable to maintain continuous contact with the EOS when it is over populated land masses, nominally between 65 degrees south and 65 degrees north in latitude. Providing this connectivity would require the use of multiple ground stations or a dedicated, leased space relay network, both of which would be very expensive. In a preferred embodiment, the required connectivity is provided using the existing constellation, and this provides cost advantages.

In alternative embodiments, the seam satellite can be a message relay communications satellite, supporting an electronic mail delivery function when the seam satellite is in view of the user. In other embodiments, the seam satellite could serve as an attachment point for several other satellites.

In step 612, the status for the system is constantly being monitored and the seam satellite access status information is updated. Procedures are performed to evaluate a seam satellite's in-use crosslinks to determine if the quantity of these in-use crosslinks exceeds a capacity limit established for the seam satellite. Capacity limits are affected by reserved crosslink resources which are those resources set aside (required) to handle hand-offs from neighboring communication satellites. Relative movement between seam satellites and communication satellites with established communication links may require hand-offs to different communication satellites.

Crosslink resource management can be performed on the ground in a gateway or in a satellite. A capacity limit can be determined by analysis of the crosslink loading between adjacent communication satellites. The capacity limit can also be dependent on the loading between a seam satellite and an edge satellite. Determination of reserve resources can be very dynamic, resulting in a dynamic reserve threshold value, or the reserve threshold value can be static. Procedure 600 ends with step 614.

Figure 7:
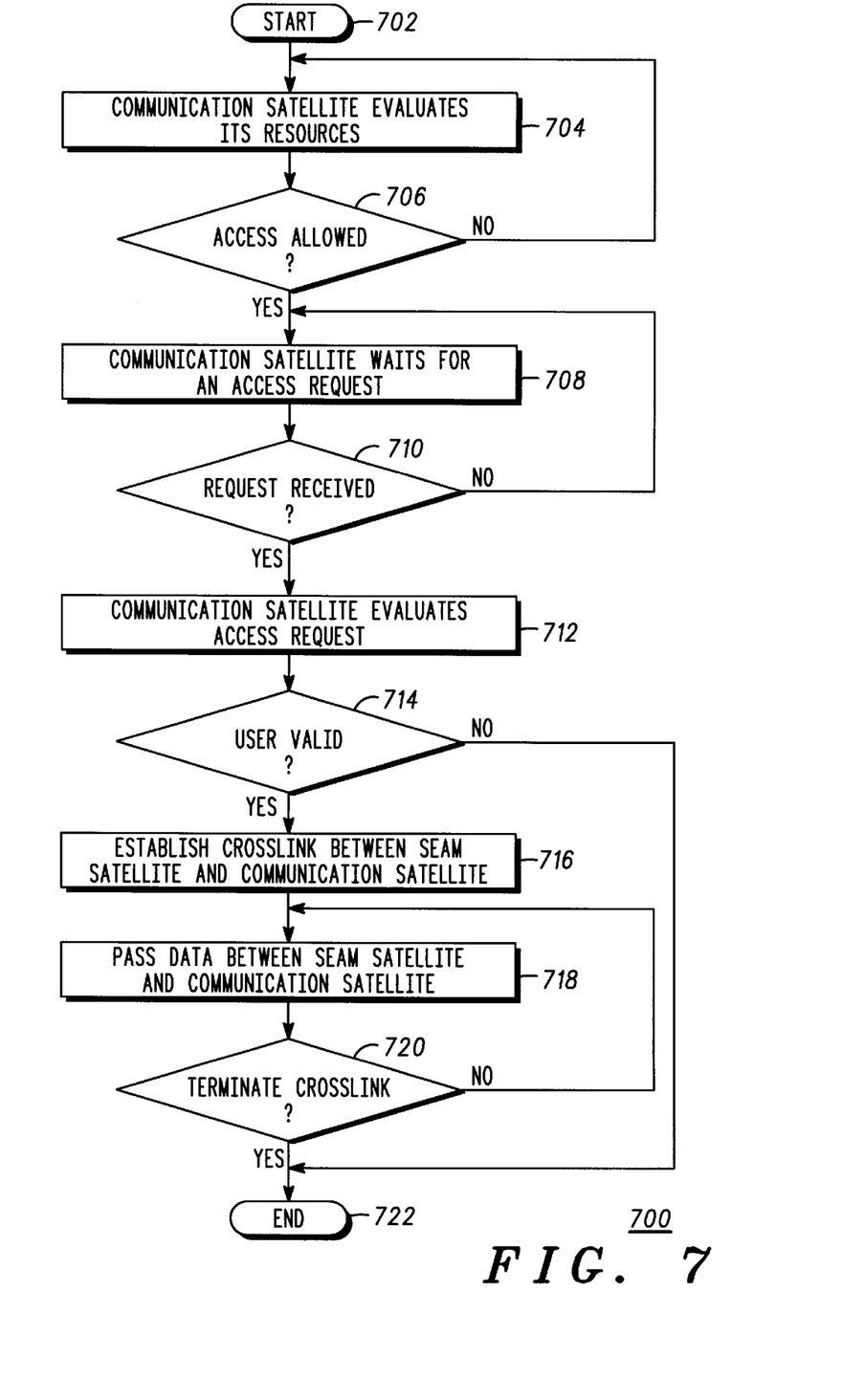
FIG. 7 shows a flow chart for operating a communication satellite in a communication system for use in regulating an attempt by a seam satellite to acquire services from the communication system in accordance with a preferred embodiment of the present invention.

FIG. 7 shows a flow chart for operating a communication satellite in a communication system for use in regulating an attempt by a seam satellite to acquire services from the communication system in accordance with a preferred embodiment of the present invention. Procedure 700 is only performed by edge satellites. Edge satellites are those satellites which lie on the edge of the constellation. There are two edges on some constellations, and these edges define an area known as the seam. Satellites on the edges of the constellation travel in opposite directions. The relative speed between satellites on the edge of the constellation is generally such that crosslinks are not attempted between the edge satellites on either side of the seam.

Task 702 starts procedure 700. This could also result from a seam satellite taking the initiative to try to gain access to a communication constellation. A seam satellite can use an earth terminal to gain access to a satellite constellation. In this case, task 702 could be the result of a command from a system control center which is responding to a request from a seam satellite's control center. Procedure 700 could also be initiated by an on-board process such as a timer expiration. A communication satellite could perform task 702 whenever it needs to evaluate its crosslink resources to determine if crosslinks to seam satellites can be allowed.

In task 704, the edge satellite evaluates its own resources to determine if access can be allowed. The number and location of crosslinks in use are determined. If crosslink resources are available then access can be allowed. If the quantity of in-use channels exceeds capacity, then the seam satellite is not allowed to access the system.

In task 706, an access determination task is performed. When task 706 determines that new seam satellites are denied access, then procedure 700 branches back to task 704. When task 706 determines that new seam satellites are not denied access, procedure 700 branches to task 708.

In task 708, edge communication satellite waits for an access request from a seam satellite. During the wait task the edge satellite can be just listening for a signal from a seam satellite or the edge satellite could initiate a broadcast transmission intended for a particular seam satellite. In task 710, a query is performed to determine if a request has been received. When task 710 determines that a seam satellite has not requested access, then procedure 700 branches back to task 708. When task 710 determines that a seam satellite has requested access, procedure 700 branches to task 712.

Seam satellite communicates with communication satellite to establish communication parameters and access privileges. This access attempt by seam satellite does not ensure crosslink resources will be granted to seam satellite, as crosslink resources may have recently been granted to another seam satellite.

In task 714, access requests are evaluated to determine if they are from valid users. Another determination is made in some cases with respect to the level of service required by the seam satellite. Sufficient resources may not be available to support all levels of users in a multi-level system. In some instances, the number of in-use crosslink channels is compared against a crosslink capacity. When the number of in-use crosslink channels exceeds the crosslink capacity, the seam satellite access status is set to deny any new seam satellite from accessing the satellite communication system. When the number of in-use channels does not exceed the crosslink capacity, the seam satellite access status is reset to allow a new seam satellite access to the satellite communication system.

When task 714 determines the seam satellite is not a valid user, then procedure 700 branches to task 722 and ends. An access denial message could be sent to the seam satellite. When task 714 determines the seam satellite is a valid user, then procedure 700 branches to task 716.

In task 716, at least one crosslink is established between the seam satellite and at least one edge satellite in the existing constellation. The seam satellite communicates with the edge communication satellite to establish communication parameters and access privileges. Seam satellite to communication satellite crosslink queues are established to ensure that seam satellite data is not lost if the inter-satellite crosslinks within the constellation become heavily loaded.

In addition, the node access table for the system must be updated to account for the new node which has been added to the communication system. In some embodiments, the new node is not made available to all users of the communication system. The new node (seam satellite) is accessible through the edge satellites to which it is crosslinked. These edge satellites have their tables changed to reflect the addition of the new terminating node.

In task 718, data is exchanged across the crosslink established between a seam satellite and a communication satellite. Seam satellite has knowledge about the data formatting rules used by the communication satellites to exchange data. Seam satellites also use these rules.

Task 720 performs a monitoring function. Task 720 looks for termination requests. If a termination request is processed by task 720, then procedure 700 branches to task 722 and ends. If a termination request is not processed, then procedure 700 branches back to task 720, and data exchange continues as required to maintain the crosslink and transfer data.

A satellite can reserve satellite capacity for high level users. Dynamic reallocation of crosslink resources is done. A communication satellite can reserve capacity to insure that new seam satellites are not denied access for an extended period of time.

Other satellite parameters that may be evaluated include, among other things, overall satellite power consumption. In many satellite applications, over-discharging a defined power budget of a rechargeable battery can have long term effects on the longevity of a satellite's battery.

Figure 8:
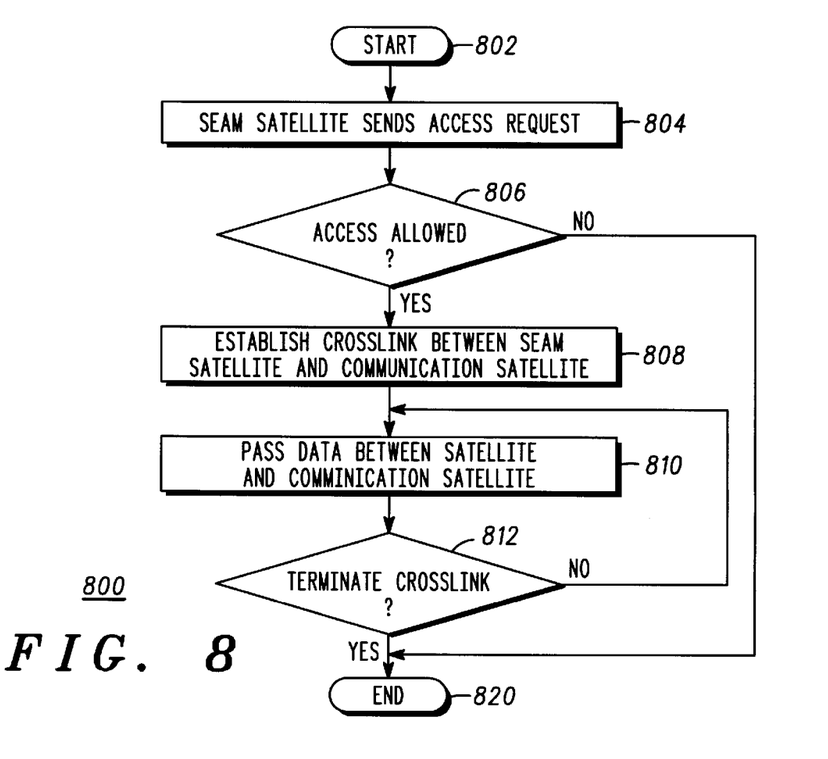
FIG. 8 shows a flow chart for operating a seam satellite to acquire services from a communication satellite in accordance with a preferred embodiment of the present invention.

FIG. 8 shows a flow chart for operating a seam satellite to acquire services from a communication satellite in accordance with a preferred embodiment of the present invention. Task 802 starts procedure 800.

In task 804, a seam satellite transmits an access request to a communication satellite. This could result if a seam satellite were monitoring a region of space for crosslink signals being broadcast from communication satellites 12 (FIG. 1). This could also result from a seam satellite taking the initiative to try to gain access to a communication constellation. This could also be the result of a command from a system control center or an on-board process such as a timer expiration or data indication from a mission payload sensor.

In task 806, a query is performed to determine if access is allowed. The message from the communication satellite is examined. When an access allowed message is received by the seam satellite, task 806 determines the seam satellite can proceed with access, and then procedure 800 branches to task 808. When an access denied message is received by the seam satellite, task 806 determines the seam satellite cannot proceed with access, and then procedure 800 branches to task 820 and ends. When the seam satellite access status is set to deny the seam satellite from accessing the satellite communication system, the seam satellite is inhibited from initiating access to the satellite communication system. When the seam satellite access status is reset to allow the seam satellite to access the satellite communication system, the seam satellite can initiate access to the satellite communication system.

Task 808 is performed after the seam satellite receives an affirmative response to its request to establish a communication crosslink with an edge satellite. In task 808, at least one crosslink is established between the seam satellite and at least one edge satellite in the existing constellation. The seam satellite communicates with the edge communication satellite to establish communication parameters and access privileges. Crosslink queues are established in the seam satellite to ensure that seam satellite data is not lost.

In task 810, data is exchanged across the crosslink established between the seam satellite and a communication satellite. The seam satellite has knowledge about the data formatting rules used by the communication satellites to exchange data. Seam satellites use these rules. For example, the crosslink data could be from an imaging device on board the seam satellite, in which case an image could be transmitted across the crosslink to the communication satellite constellation and then to a particular image processing device.

Task 812 performs a monitoring function. Task 812 looks for termination requests. A termination request can originate within the seam satellite, from a seam satellite control center, or from the communication satellites or their control center. If a termination request is processed by task 812, then procedure 800 ends. If a termination request is not processed, then task 810 continues and data is exchanged as required to maintain the crosslink and to transfer data.

Figure 9:
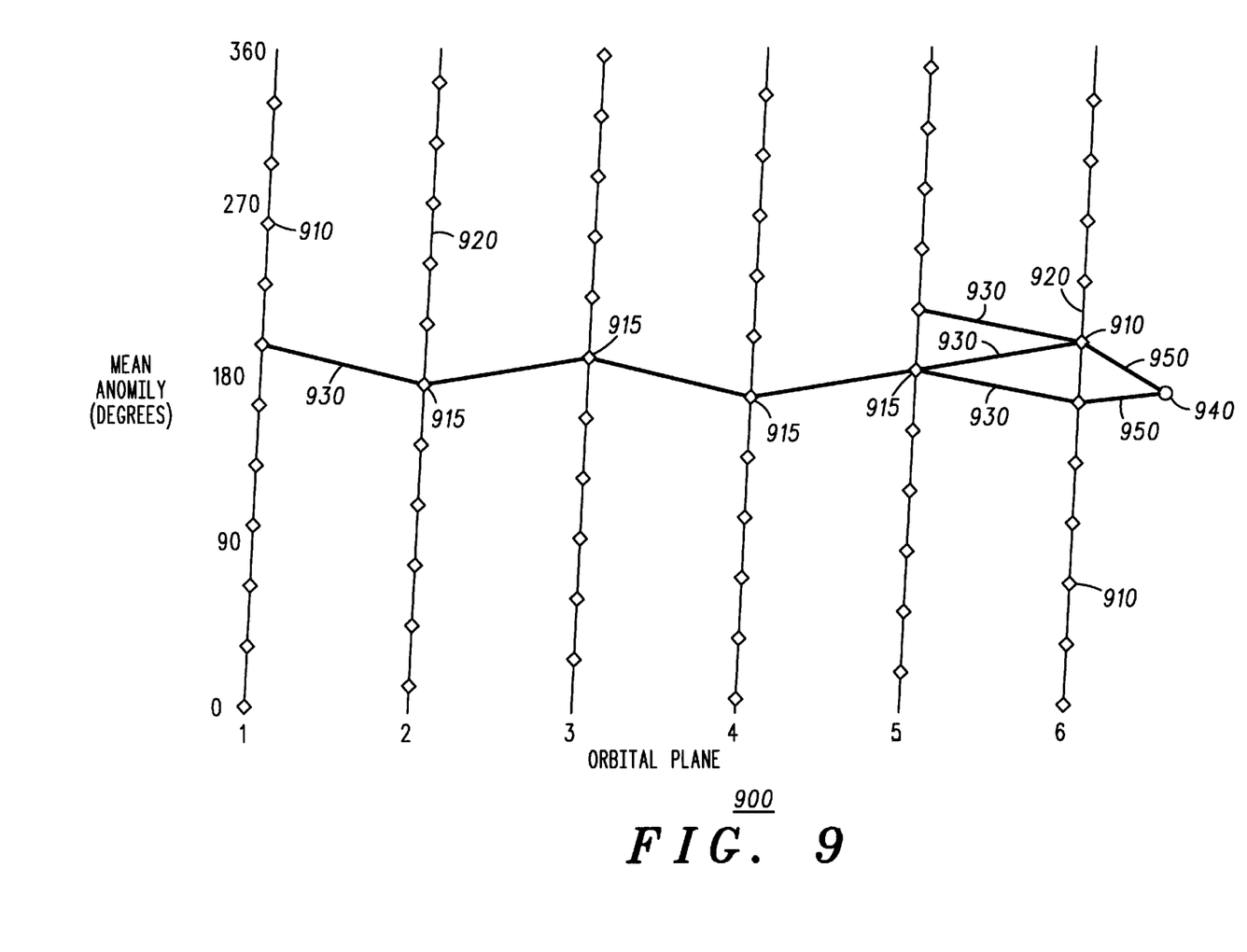
FIG. 9 shows a simplified interconnect diagram for links between satellites in an exemplary system in accordance with a preferred embodiment of the present invention.

FIG. 9 shows a simplified interconnect diagram for links between satellites in an exemplary system in accordance with a preferred embodiment of the present invention. Exemplary system 900 comprises communication satellites 910, 915 and at least one seam satellite 940. Communication satellites 915 are located in orbital planes (k=2)–(k=5), and communication satellites 910 are located in orbital plane (k=1) and orbital plane (k=6).

Communication satellites 915 located in orbital plane (k=2) can be interconnected via links 920 to its nearest neighbors 915 in orbital plane (k=2), interconnected via links 930 to its nearest neighbors 910 in orbital plane (k=1), and interconnected via links 930 to its nearest neighbors 915 in plane (k=3). Communication satellites 915 located in orbital plane (k=3) can be interconnected via links 920 to its nearest neighbors 915 in orbital plane (k=3), interconnected via links 930 to its nearest neighbors 915 in orbital plane (k=2), and interconnected via links 930 to its nearest neighbors 915 in plane (k=4). Communication satellites 915 located in orbital plane (k=4) can be interconnected via links 920 to its nearest neighbors 915 in orbital plane (k=4), interconnected via links 930 to its nearest neighbors 915 in orbital plane (k=3), and interconnected via links 930 to its nearest neighbors 915 in plane (k=5). Communication satellites 915 located in orbital plane (k=5) can be interconnected via links 920 to its nearest neighbors 915 in orbital plane (k=5), interconnected via links 930 to its nearest neighbors 915 in orbital plane (k=4), and interconnected via links 930 to its nearest neighbors 910 in plane (k=6).

Communication satellites 910 located in orbital plane (k=1) can be interconnected via links 920 to its nearest neighbors 910 in orbital plane (k=1), and interconnected via links 930 to its nearest neighbors 915 in plane (k=2). Communication satellites 910 located in orbital plane (k=6) can be interconnected via links 920 to its nearest neighbors 910 in orbital plane (k=6), and interconnected via links 930 to its nearest neighbors 915 in plane (k=5). A seam exists between orbital planes (k=1) and (k=6) in exemplary system 900. Communication satellites 910 located at either edge of the seam are edge satellites and have crosslink resources which can be used to interconnect seam satellites 940.

Seam satellite 940 is shown with crosslinks 950 to two edge satellites 910 located in orbital plane (k=6). Seam satellite's relative motion with respect to communication satellites 910 is substantially identical to the relative motion between communication satellites 915 and communication satellites 910. Crosslink 950 can be an RF or laser crosslink. Those skilled in the art will recognize that seam satellites 940 can take advantage of the unused crosslink resources in all eleven of the edge satellites shown in orbital plane (k=6) in exemplary system 900. Those skilled in the art will also recognize that seam satellites 940 can take advantage of the unused crosslink resources in all eleven of the edge satellites shown in orbital plane (k=1) in exemplary system 900.

The advantage of the present invention is that the seam satellites are interconnected and coordinated into an existing space-based communication system. The various resources on the separate seam satellites work independently to accomplish their mission critical tasks and work together with the communication satellites to perform the necessary data transferring functions. Coordination is accomplished through the crosslinks established between the satellites. The crosslink can be via radio or optical means. Clusters of satellites can be linked into an existing communication system using a minimum number of seam satellites. This leads to more capability on orbit for mission operations and communications.

An important feature of the method and apparatus of the present invention is that an existing system's processing capability can be increased to meet new mission demands. With some missions, only modest additional loading will occur. Traditionally, this new demand can only be achieved by launching many additional satellites. With the apparatus and method of the present invention, it is only necessary to launch and link-in less-expensive and lighter satellites designed to provide specific new services. This allows improved production economies.

The seam satellite concept enables the capabilities of a satellite communication system to be increased. By executing various processes on seam satellites and networking the seam satellites into the communication system through crosslinks, the system's capability increases with the number of seam satellites used.

The method and apparatus of the present invention enable the capabilities of a satellite constellation to be greatly enhanced through the use of seam satellites with synchronized orbits. Seam satellites can be optimized for various missions and additional cost benefits can be accrued by the system using the method and apparatus of the present invention.

The present invention has been described above with reference to a preferred embodiment. However, those skilled in the art will recognize that changes and modifications can be made in this embodiment without departing from the scope of the present invention. For example, while a preferred embodiment has been described in terms of using a specific number of seam satellites for configuring a system, other systems can be envisioned which use different numbers of seam satellites. Accordingly, these and other changes and modifications which are obvious to those skilled in the art are intended to be included within the scope of the present invention.

As described herein, the advantages of the present invention will be apparent to those of skill in the art and include providing improved apparatus and methods for adding and managing the access of seam satellites in a resource limited communication system. These advantages include improved utilization of space-based resources by allowing additional users access to the existing communication system. The advantages also include being able to provide communication services to a variety of other additional users without modifying the communication satellites.

What is claimed is:

1. A method for providing additional resources in a satellite communication system wherein said satellite communication system comprises a plurality of communication satellites located in orbital planes and a seam exists between a first orbital plane and an other orbital plane, said seam existing when said first orbital plane and said other orbital plane are adjacent and first communication satellites traveling in said first orbital plane are moving in a direction opposite to other communication satellites traveling in said other orbital plane and crosslinks do not exist between said first orbital plane and said other orbital plane, said method comprising the steps of:

positioning at least one seam satellite between said first orbital plane and said other orbital plane;

crosslinking said at least one seam satellite to an edge satellite, said edge satellite is one of said other communication satellites or one of said first communication satellites, said crosslinking accomplished by a crosslink communication channel between said at least one seam satellite and said edge satellite;

adding said at least one seam satellite to a node access list, said node access list denoting accessibility to said at least one seam satellite in said satellite communication system;

using said at least one seam satellite to provide said additional resources; and updating said node access list according to dynamic conditions in said satellite communication system, wherein said updating step comprises the steps of:

comparing in-use crosslink channels against a crosslink capacity;

setting a seam satellite access status to deny a new seam satellite from accessing said satellite communication system, when said in-use crosslink channels exceeds said crosslink capacity; and resetting said seam satellite access status to allow said new seam satellite to access said satellite communication system, when said in-use crosslink channels does not exceed said crosslink capacity.

2. The method as claimed in claim 1, wherein said positioning step comprises the steps of:

calculating orbital parameters for said at least one seam satellite using equations which were used to calculate orbital parameters for said plurality of communication satellites; and establishing a spacing distance based on a collision avoidance plan which is generated from said orbital parameters.

3. The method as claimed in claim 1, wherein said positioning step comprises the step of:

positioning said at least one seam satellite in an orbital plane that is substantially close to said seam.

4. The method as claimed in claim 1, wherein said crosslinking step comprises the steps of:

sending an access request from said at least one seam satellite to said edge satellite;

receiving said access request by said edge satellite;

sending an access denied message from said edge satellite to said at least one seam satellite when said edge satellite determines that said access request cannot be serviced and setting seam satellite access status to deny said at least one seam satellite from accessing said satellite communication system; and said at least one seam satellite cooperating with said edge satellite to establish a crosslink between said at least one seam satellite and said edge satellite when said edge satellite determines that said access request can be serviced and setting said seam satellite access status to allow said at least one seam satellite to access said satellite communication system.

5. The method as claimed in claim 4, wherein said crosslinking step further comprises the steps of:

when said seam satellite access status is set to deny said at least one seam satellite from accessing said satellite communication system, said at least one seam satellite abstains access to said satellite communication system; and when said seam satellite access status is reset to allow said at least one seam satellite to access said satellite communication system, said at least one seam satellite initiates access to said satellite communication system.

6. The method as claimed in claim 1, wherein said adding step comprises the steps of:

establishing said at least one seam satellite as a new terminating node in said node access list for said satellite communication system; and transmitting said node access list on a broadcast channel of said satellite communication system to inform certain system resources about said new terminating node.

7. The method as claimed in claim 1, wherein said using step comprises the steps of:

passing control data between said at least one seam satellite and said edge satellite to control said crosslink communication channel; and passing mission data between said at least one seam satellite and said edge satellite as required to satisfy mission requirements.

8. The method as claimed in claim 1, wherein said updating step further comprises the steps of:

comparing in-use system crosslink channels against a system crosslink channel capacity;

when said in-use system crosslink channels exceeds said system crosslink channel capacity, said updating step comprises the step of setting said seam satellite access status to deny a new seam satellite from accessing said satellite communication system; and when said updating step does not set said seam satellite access status to deny, said updating step comprises the step of resetting said seam satellite access status to allow said new seam satellite to access said satellite communication system.

9. A method for operating a seam satellite to provide additional resources in a satellite communication system wherein said satellite communication system comprises a plurality of communication satellites located in orbital planes and a seam exists between a first orbital plane and an other orbital plane, said seam existing when said first orbital plane and said other orbital plane are adjacent and first communication satellites traveling in said first orbital plane are moving in a direction opposite to other communication satellites traveling in said other orbital plane and crosslinks do not exist between said first orbital plane and said other orbital plane, said method comprising the steps of:

positioning said seam satellite between said first orbital plane and said other orbital plane;

crosslinking said seam satellite to an edge satellite, said edge satellite is one of said other communication satellites or one of said first communication satellites, said crosslinking accomplished by a crosslink communication channel between said seam satellite and said edge satellite, wherein said crosslinking step comprises the steps of:

sending an access request from said seam satellite to said edge satellite; and receiving a message from said edge satellite, said message comprising a seam satellite access status, when said seam satellite access status is set to deny said seam satellite from accessing said communication system, said seam satellite abstains access to said communication system, and when said seam satellite access status is reset to allow said seam satellite to access said communication system, said seam satellite initiates access to said satellite communication system; and using said seam satellite to provide said additional resources.

10. The method as claimed in claim 9, wherein said positioning step comprises the steps of:

calculating orbital parameters for said seam satellite using equations which were used to calculate said orbital parameters for said plurality of communication satellites; and establishing a spacing distance based on a collision avoidance plan which is generated from said orbital parameters.

11. The method as claimed in claim 9, wherein said crosslinking step comprises the steps of:

receiving said access request from said seam satellite by said edge satellite;

determining if said seam satellite is a valid user; and sending said acknowledgment message from said edge satellite, said acknowledgment message comprising said seam satellite access status, wherein said seam satellite access status is set to deny said seam satellite from accessing said communication system when said seam satellite is not a valid user.

12. The method as claimed in claim 9, wherein said crosslinking step further comprises the steps of:

receiving, by said edge satellite, said access request from said seam satellite;

determining if resources are available; and sending said acknowledgment message from said edge satellite, said acknowledgment message comprising said seam satellite access status, wherein said seam satellite access status is set to deny said seam satellite from accessing said communication system when said resources are not available.

13. The method as claimed in claim 9, wherein said using step comprises the steps of:
   passing control data between said seam satellite and said edge satellite to control said crosslink communication channel; and
   passing mission data between said at seam satellite and said edge satellite as required to satisfy mission requirements.

14. A satellite communication system comprising:
   a plurality of communication satellites located in orbital planes wherein a seam exists between a first orbital plane and an other orbital plane, said seam existing when said first orbital plane and said other orbital plane are adjacent and first communication satellites traveling in said first orbital plane are moving in a direction opposite to other communication satellites traveling in said other orbital plane and crosslinks do not exist between said first orbital plane and said other orbital plane;
   at least one seam satellite positioned in an orbital plane that is substantially within said seam between said first orbital plane and said other orbital plane, said at least one seam satellite being crosslinked to an edge satellite wherein said edge satellite is one of said other communication satellites or one of said first communication satellites, and said at least one seam satellite providing additional services in said satellite communication system when said at least one seam satellite is crosslinked to said edge satellite;
   a plurality of communication units some of which are for requesting said additional services from said at least one seam satellite; and
   at least one control center for controlling said plurality of communication satellites and said at least one seam satellite.

15. The satellite communication system as claimed in claim 14, wherein said plurality of communication satellites and said at least one seam satellite are located substantially within a common orbital shell.

16. The satellite communication system as claimed in claim 14, wherein said at least one seam satellite is an Earth Observation Satellite.

17. A seam satellite for use in a satellite communication system, wherein said seam satellite comprises:
   an earth-link antenna unit for receiving and transmitting signals by said seam satellite, said signals being command and control signals;
   an earth-link transceiver coupled to said earth-link antenna unit, for processing said command and control signals;
   a crosslink antenna unit for receiving and transmitting crosslink signals by said seam satellite, said crosslink signals being command signals, control signals, and communication signals that allow said seam satellite to be incorporated into said satellite communication system;
   a crosslink transceiver coupled to said crosslink antenna unit, said crosslink transceiver for processing said crosslink signals;
   a mission payload antenna unit for receiving and transmitting mission critical signals by said seam satellite;
   a mission payload transceiver coupled to said mission payload antenna unit, said mission payload transceiver for processing said mission critical signals;
   a controller coupled to said earth-link transceiver, to said crosslink transceiver, and to said mission payload transceiver, said controller processing command data, control data, mission critical data, and communication data, and said controller determining when said seam satellite can be incorporated into said satellite communication system;
   a timer means coupled to said controller; and
   a memory means coupled to said controller.

18. A communication unit for operating in a satellite communication system wherein said satellite communication system comprises a plurality of communication satellites located in orbital planes wherein a seam exists between a first orbital plane and an other orbital plane, said seam existing when said first orbital plane and said other orbital plane are adjacent and first communication satellites traveling in said first orbital plane are moving in a direction opposite to other communication satellites traveling in said other orbital plane and crosslinks do not exist between said first orbital plane and said other orbital plane, at least one seam satellite wherein said at least one seam satellite is positioned between said first orbital plane and said other orbital plane, said at least one seam satellite being crosslinked to an edge satellite wherein said edge satellite is one of said other communication satellites or one of said first communication satellites, and said at least one seam satellite provides additional services in said satellite communication system, a plurality of communication units some of which for requesting said additional services from said at least one seam satellite, and at least one control center for controlling said plurality of communication satellites and said at least one seam satellite, said communication unit comprising:
   a transceiver for receiving data from and transmitting data to said at least one seam satellite via said plurality of communication satellites, wherein received data comprises seam satellite access status and transmitted data comprises an access request; and
   a processor for processing said received data, for processing said transmitted data, for prohibiting access to said at least one seam satellite when said seam satellite access status is set to deny said communication unit from accessing said at least one seam satellite in said satellite communication system, and for initiating access to said at least one seam satellite when said seam satellite access status is reset to allow said communication unit to access said at least one seam satellite in said satellite communication system.

19. A communication unit as claimed in claim 18, wherein said communication unit further comprises:
   a second transceiver, coupled to said processor, for receiving data from and transmitting data to said at least one seam satellite, wherein data transmitted by said second transceiver comprises a request for access, and data received by said second transceiver comprises said seam satellite access status, wherein
   said processor is further for processing said seam satellite access status from said second transceiver,
   for prohibiting access to said at least one seam satellite when said seam satellite access status is set to deny said communication unit from accessing said at least one seam satellite in said satellite communication system,
   and for initiating access to said at least one seam satellite when said seam satellite access status is reset to allow said communication unit to access said at least one seam satellite in said satellite communication system.

20. A communication unit as claimed in claim 18, wherein said communication unit is further
   for transmitting a request for said additional services in response to said at least one seam satellite initiating access to said satellite communication system.

* * * * *